United States Patent
Zhou et al.

(10) Patent No.: US 10,545,808 B2
(45) Date of Patent: Jan. 28, 2020

(54) METHOD, APPARATUS AND SYSTEM FOR PROCESSING DATA

(71) Applicant: Hangzhou Hikvision Digital Technology Co., Ltd., Zhejiang (CN)

(72) Inventors: Shuang Zhou, Zhejiang (CN); Jian Chen, Zhejiang (CN); Hui Qiao, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 125 days.

(21) Appl. No.: 15/568,011

(22) PCT Filed: Sep. 14, 2016

(86) PCT No.: PCT/CN2016/099004
§ 371 (c)(1),
(2) Date: Oct. 20, 2017

(87) PCT Pub. No.: WO2017/215137
PCT Pub. Date: Dec. 21, 2017

(65) Prior Publication Data
US 2018/0293121 A1    Oct. 11, 2018

(30) Foreign Application Priority Data

Jun. 14, 2016 (CN) .......................... 2016 1 0417424

(51) Int. Cl.
G06F 11/07    (2006.01)
G06F 3/06     (2006.01)
G06F 12/06    (2006.01)

(52) U.S. Cl.
CPC ............ G06F 11/076 (2013.01); G06F 3/061 (2013.01); G06F 3/0658 (2013.01);
(Continued)

(58) Field of Classification Search
CPC .... G06F 11/076; G06F 11/00; G06F 11/1016; G06F 11/1044; G06F 11/1048; G06F 3/0619; G06F 3/064; G06F 3/0653
See application file for complete search history.

(56) References Cited

U.S. PATENT DOCUMENTS 6,976,116 B2 * 12/2005 Aruga ................... G06F 3/0613
                                                           710/316
8,213,229 B2 *  7/2012 Wilson ................ G06F 11/1068
                                                           365/185.09

(Continued)

FOREIGN PATENT DOCUMENTS

CN    101740110       6/2010
CN    101911074 A    12/2010
(Continued)

OTHER PUBLICATIONS

International Search Report issued in International Application No. PCT/CN2016/099004, dated Mar. 16, 2017.
(Continued)

Primary Examiner — Nadeem Iqbal
(74) Attorney, Agent, or Firm — Meunier Carlin & Curfman LLC

(57) ABSTRACT

Embodiments of the present application provide a method, apparatus and system for processing data, the method is applicable to an electronic device, wherein the electronic device is connected to a memory card that has been formatted in a proprietary manner in advance and the memory card includes at least one cold data area. The method includes: obtaining the number $C_R$ of reads for data stored in a target cold data area C stored locally; determining whether the number $C_R$ of reads reaches a preset threshold $T_{CR}$ for reading failure of cold data; if the number $C_R$ of reads reaches a preset threshold $T_{CR}$ for reading failure of cold data, transmitting a start address and a end address of the (Continued)

data stored in the target cold data area C to a controller of the memory card, and initializing the number $C_R$ of reads for processing the stored data by the controller according to the start address and the end address. By applying the embodiments of the present application, the calculation amount of a memory card is reduced, and thereby the reading and writing performance for data of the memory card is improved.

14 Claims, 6 Drawing Sheets

(52) U.S. Cl.
CPC .......... *G06F 3/0659* (2013.01); *G06F 3/0679* (2013.01); *G06F 11/0727* (2013.01); *G06F 12/06* (2013.01); *G06F 2212/1016* (2013.01); *G06F 2212/171* (2013.01)

(56) References Cited

U.S. PATENT DOCUMENTS

| | | | |
|---|---|---|---|
| 9,053,006 B2* | 6/2015 | Hinkel | G06F 12/0246 |
| 9,389,805 B2* | 7/2016 | Cohen | G06F 3/0679 |
| 9,569,120 B2* | 2/2017 | Ryan | G11C 16/349 |
| 2009/0083478 A1 | 3/2009 | Kunimatsu et al. | |
| 2012/0011299 A1 | 1/2012 | Mylly | |
| 2012/0311237 A1* | 12/2012 | Park | G06F 12/0246 711/103 |
| 2015/0268871 A1 | 9/2015 | Shu et al. | |

FOREIGN PATENT DOCUMENTS

| | | |
|---|---|---|
| CN | 103699492 | 4/2014 |
| CN | 103777905 | 5/2014 |
| CN | 105242871 A | 1/2016 |
| JP | 2010186341 A | 8/2010 |
| WO | 2015185002 | 12/2015 |

OTHER PUBLICATIONS

International Preliminary Report on Patentability issued in International Application No. PCT/CN2016/099004, dated Dec. 18, 2018.
Extended European Search Report issued for European Application No. 16897479.8, dated Jan. 3, 2019, 14 pages.
First Office Action; Chinese Application No. 201610417424.7; dated Apr. 1, 2019.

* cited by examiner

METHOD, APPARATUS AND SYSTEM FOR PROCESSING DATA

CROSS REFERENCE TO RELATED APPLICATION

The present application claims the priority to a Chinese patent application No. 201610417424.7, filed with the State Intellectual Property Office of People's Republic of China on Jun. 14, 2016 and entitled "Method, Apparatus and System for Processing Data", which is hereby incorporated into the present application by reference in its entirety.

TECHNICAL FIELD

The present application relates to the field of data processing technology, in particular to a data processing method, apparatus and system.

BACKGROUND

A solid-state memory card (referred to as a "memory card" for short) refers to a card using a flash memory chip (e.g., a NAND Flash, etc.) as a storage medium. At present, memory cards have been widely used in various electronic devices (e.g., webcams, laptops, handheld game consoles, etc.), and the electronic devices can perform data reading and writing operations on the data on a memory card.

The data reading and writing operations of a memory card are in units of physical pages (referred to as "pages" for short), wherein unbalanced operations could exist while storing and reading data, i.e. the data reading frequencies of a memory card are different in different pages, wherein the data with a higher reading frequency but a lower writing frequency is called cold data, and the cold data is not conducive to the balanced use of storage space on a memory card due to its higher reading frequency but lower writing frequency. In addition, the storage particles store data by electric charges, and when the data reading count reaches a certain extent, the phenomenon of reading failure will appear, rendering the storage charges change, that is, when the cold data reading count reaches a certain extent, the problem that data cannot be read (i.e., a reading failure) is prone to happen. It can be seen that it is necessary to process the cold data on a memory card (such as a data transfer, etc).

In the prior art, an electronic device needs to scan data on a memory card first by using a mapping relationship of the FTL (Flash Translation Layer) algorithm before processing cold data and determine whether the scanned data is cold data, and then to process the cold data on the memory card according to the determination result. However, the process of scanning data on a memory card and determining whether it is cold data often requires a large amount of calculations, and the cold data scanning and determination are again performed by the FTL on the memory card, while the operations of reading and writing data on a memory card also need to be performed by the FTL, therefore, the cold data scanning and determination increase the calculation amount of a memory card, and reduce the data reading and writing performance of the memory card.

SUMMARY OF THE INVENTION

The object of embodiments of the present application is to provide a data processing method, apparatus and system to reduce the calculation amount of a memory card, thereby improving the reading and writing performance for data of the memory card.

In order to achieve the above object, an embodiment of the present application discloses a method for processing data, which is applicable an electronic device, wherein the electronic device is connected to a memory card that has been formatted in a proprietary manner in advance and the memory card includes at least one cold data area. The method includes:

obtaining the number $C_R$ of reads for data stored in a target cold data area C stored locally;

determining whether the number $C_R$ of reads reaches a preset threshold $T_{CR}$ for reading failure of cold data;

if the number $C_R$ of reads reaches a preset threshold $T_{CR}$ for reading failure of cold data, transmitting a start address and a end address of the data stored in the target cold data area C to a controller of the memory card, and initializing the number $C_R$ of reads for processing the stored data by the controller according to the start address and the end address.

Optionally, in case of determining that the number $C_R$ of reads does not reach the preset threshold $T_{CR}$ for reading failure of cold data, the method further includes:

obtaining the number $C_W$ of writes for data in the target cold data area C stored locally;

determining whether the number $C_W$ of writes is smaller than a preset first threshold $T_{CW1}$ for the number of writes for cold data;

if the number $C_W$ of writes is smaller than a preset first threshold $T_{CW1}$ for the number of writes for cold data, transmitting the start address and the end address of the data stored in the target cold data area C to the controller of the memory card, and initializing the number $C_R$ of reads and the number $C_W$ of writes respectively for processing the stored data by the controller according to the start address and the end address.

Optionally, the memory card further includes at least one hot data area. In case of determining that the number $C_R$ of reads does not reach the preset threshold $T_{CR}$ for reading failure of cold data, the method further includes:

obtaining the number $C_W$ of writes for data in the target cold data area C stored locally and the number $H_W$ of writes for data in a target hot data area H;

determining whether the number $H_W$ of writes reaches a preset threshold $T_{HW}$ for the number of writes for hot data;

if the number $H_W$ of writes reaches a preset threshold $T_{HW}$ for the number of writes for hot data, determining whether the number $C_W$ of writes is smaller than a preset second threshold $T_{CW2}$ for the number of writes for cold data;

if the number $C_W$ of writes is smaller than the second threshold $T_{CW2}$ for the number of writes for cold data, transmitting the start address and the end address of the data stored in the target cold data area C to the controller of the memory card, and initializing the number $C_R$ of reads, the number $C_W$ of writes and the number $H_W$ of writes respectively for processing the stored data by the controller according to the start address and the end address.

Optionally, the step of processing the stored data by the controller according to the start address and the end address includes:

converting the start address and the end address into a corresponding physical start address and a corresponding physical end address respectively by the controller based on a mapping relationship between a logical address and a physical address provided by a flash translation layer FTL;

transferring the data corresponding to the physical start address and the physical end address into released block storage spaces according to a sequential order in which block storage spaces on the memory card is released, and updating the mapping relationship according to the current physical start address and the physical end address of the transferred data.

Optionally, the step of transmitting the start address and the end address of the data stored in the target cold data area C to the controller of the memory card includes:

generating a cold data processing table containing the start address and the end address; and transmitting the cold data processing table to the controller.

Optionally, the cold data processing table includes a header identifier and a trailer identifier;

the step of processing the stored data by the controller according to the start address and the end address includes:

determining whether the cold data processing table is valid by the controller based on the header identifier and the trailer identifier; if the cold data processing table is valid, processing the stored data corresponding to the start address and the end address.

Optionally, the cold data processing table includes priorities corresponding to the cold data, wherein the priorities are determined based on the number $C_W$ of writes;

the step of processing the stored data by the controller according to the start address and the end address includes:

processing the stored data corresponding to the start address and the end address correspond by the controller according to the priorities.

In order to achieve the above object, an embodiment of the present application also discloses an apparatus for processing data, which is applicable to an electronic device, wherein the electronic device is connected to a memory card that has been formatted in a proprietary manner in advance and the memory card includes at least one cold data area. The apparatus includes:

a reads number obtaining unit, configured to obtain the number $C_R$ of reads for data stored in a target cold data area C stored locally; and a reads number determination unit, configured to determine whether the number $C_R$ of reads reaches a preset threshold $T_{CR}$ for reading failure of cold data;

an information transmission unit, configured to transmit, in case that the determination result of the reads number determination unit is YES, a start address and a end address of the data stored in the target cold data area C to a controller of the memory card, and initializing the number $C_R$ of reads for processing the stored data by the controller according to the start address and the end address.

Optionally, the apparatus further includes:

a first writes number obtaining unit, configured to obtain the number $C_W$ of writes for data in the target cold data area C stored locally in case that the determination result of the reads number determination unit is NO; and a first writes number determination unit, configured to determine whether the number $C_W$ of writes is smaller than a preset first threshold $T_{CW1}$ for the number of writes for cold data, if the number $C_W$ of writes is smaller than a preset first threshold $T_{CW1}$ for the number of writes for cold data, trigger the information transmission unit, the information transmission unit is specifically configured to:

transmit the start address and the end address of the data stored in the target cold data area C to the controller of the memory card, and initialize the number $C_R$ of reads and the number $C_W$ of writes respectively for processing the stored data by the controller according to the start address and the end address.

Optionally, the memory card further includes at least one hot data area. The apparatus further includes:

a second writes number obtaining unit, configured to obtain the number $C_W$ of writes for data in the target cold data area C stored locally and the number $H_W$ of writes for data in a target hot data area H in case that the determination result of the reads number determination unit is NO; and a second writes number determination unit, configured to determine whether the number $H_W$ of writes reaches a preset threshold $T_{HW}$ for the number of writes for hot data, if the threshold $T_{HW}$ for the number of writes is reached, determine whether the number $C_W$ of writes is smaller than a preset second threshold $T_{CW2}$ for the number of writes for cold data, if the number $C_W$ of writes is smaller than a preset second threshold $T_{CW2}$ for the number of writes for cold data, trigger the information transmission unit;

the information transmission unit being specifically configured to:

transmit the start address and the end address of the data stored in the target cold data area C to the controller of the memory card, and initialize the number $C_R$ of reads, the number $C_W$ of writes and the number $H_W$ of writes respectively for processing the stored data by the controller according to the start address and the end address.

In order to achieve the above object, an embodiment of the present application also discloses a data processing system including an electronic device and a memory card, wherein the electronic device is connected to the memory card, and the memory card has been formatted in a proprietary manner in advance and includes at least one cold data area:

the electronic device is configured to obtain the number $C_R$ of reads for data stored in a target cold data area C stored locally, determine whether the number $C_R$ of reads reaches a preset threshold $T_{CR}$ for reading failure of cold data, and if the number $C_R$ of reads reaches a preset threshold $T_{CR}$ for reading failure of cold data, transmit a start address and a end address of the data stored in the target cold data area C to a controller of the memory card, and initialize the number $C_R$ of reads; and the memory card comprises a controller configured to process the stored data according to the start address and the end address.

Optionally, the controller is specifically configured to:

convert the start address and the end address into a corresponding physical start address and a corresponding physical end address respectively by the controller based on a mapping relationship between a logical address and a physical address provided by a flash translation layer FTL; transfer the data corresponding to the physical start address and the physical end address into released block storage spaces according to a sequential order in which block storage spaces on the memory card is released, and update the mapping relationship according to the current physical start address and the physical end address of the transferred data.

Optionally, the electronic device is specifically configured to generate a cold data processing table containing the start address and the end address, and transmit the cold data processing table to the controller.

Optionally, the cold data processing table further includes a header identifier and a trailer identifier;

the controller is specifically configured to:

determine whether the cold data processing table is valid by the controller based on the header identifier and the trailer identifier; if the cold data processing table is valid, process the stored data corresponding to the start address and the end address.

Optionally, the cold data processing table further includes priorities corresponding to the cold data, wherein the priorities are determined based on the number $C_W$ of writes;

the controller is specifically configured to:

process the data corresponding to the start address and the end address correspond according to the priorities.

In order to achieve the above object, an embodiment of the present application discloses an electronic device, which includes:

a processor, a memory, communication interfaces and a bus;

the processor, the memory and the communication interfaces are connected and communicate with each other via the bus;

the memory is configured to store executable program codes;

the processor is configured to execute programs corresponding to the executable program codes by reading the executable program codes stored in the memory so as to perform the method for processing data described by the embodiments of the present application.

In order to achieve the above object, an embodiment of the present application discloses an application program configured to carry out the method for processing data described by the embodiments of the present application when being executed.

In order to achieve the above object, an embodiment of the present application discloses a storage medium is configured to store an application program for carrying out the method for processing data described by the embodiments of the present application.

It can be seen that in the embodiments of the present invention, an electronic device obtains the number $C_R$ of reads for data stored in a target cold data area C stored locally; in case that the number $C_R$ of reads reaches a preset threshold $T_{CR}$ for reading failure of cold data, the electronic device can determine that the stored data in the target cold data area C is the data to be processed, and then transmit a start address and a end address of the data stored in the target cold data area C to the controller of the memory card and initialize the number $C_R$ of reads; and the controller processes the stored data according to the start address and the end address. Here, the cold data scanning and determination are both completed by the electronic device, while the memory card only needs to process data, which reduces the calculation amount of the memory card, thereby improving the data reading and writing performance of the memory card.

BRIEF DESCRIPTION OF DRAWINGS

In order to describe embodiments of the present application or technical solutions in prior art more clearly, the drawings used for describing embodiments of the present invention or the prior art will be described briefly below. It is obvious that the drawings below are for only some embodiments of the present invention, and those skilled in the art can also obtain further drawings based on these drawings without any creative efforts.

DETAILED DESCRIPTION OF THE INVENTION

In order to make the purpose, the technical solutions and the advantages of the present application more clear, the present application will be described in further detail below with reference to the accompanying drawings in combination with the embodiments. Obviously, the described embodiments are only a part of the embodiments of the present application, rather than all of the embodiments. All other embodiments obtained based on the embodiments of the present application by those skilled in the art without any creative work fall into the protection scope defined by the present application.

The present application will be described in detail below by means of detailed embodiments.

Figure 1:
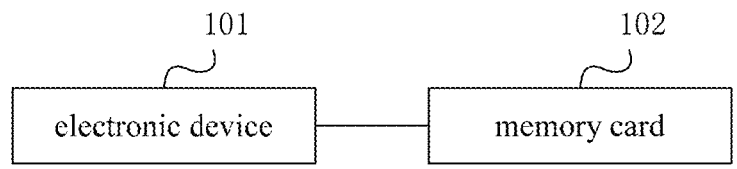
FIG. 1 is a schematic structural diagram of a data processing system provided by an embodiment of the present application.

Reference to FIG. 1, it is a schematic structural diagram of a data processing system provided by an embodiment of the present application. The system includes an electronic device 101 and a memory card 102, wherein the electronic device 101 is connected to the memory card 102, and the memory card 102 has been formatted in a proprietary manner in advance and includes at least one cold data area;

wherein the electronic device 101 is configured to obtain the number $C_R$ of reads for data stored in a target cold data area C stored locally, determine whether the number $C_R$ of reads reaches a preset threshold $T_{CR}$ for reading failure of cold data, and if the number $C_R$ of reads reaches a preset threshold $T_{CR}$ for reading failure of cold data, transmit a start address and a end address of the data stored in the target cold data area C to a controller of the memory card, and initialize the number $C_R$ of reads.

In one implementation of the present application, the electronic device 101 may be a webcam. In one embodiment, the webcam subjects the memory card to private formatting first before storing data on the memory card connected thereto, and then creates a cold data area on the memory card in a fixed writing mode.

It is understandable that in a particular operating system, the operating system provider will typically develop a corresponding formatting method in conjunction with the characteristics of its operating system and provide it to the user. For example, in the Microsoft operating system, a common formatting method is a formatting method provided by the Microsoft. In the present embodiment, in consideration of various factors such as the different characteristics of various application scenarios and data security, the memory card can be formatted in a proprietary manner in advance.

Based on the above information, formatting in a proprietary manner can be understood as a formatting method developed by developers based on the specific circumstances, and the formatting method can be obtained by the developers improving the formatting method provided by the operating system provider, or can be developed by the developers themselves, to which the present application is not limited.

In addition, the above-described formatting in a proprietary manner may be compatible with, or incompatible with the formatting method provided by the operating system provider, to which the present application is not limited.

In one embodiment, the cold data area is configured to store cold data.

It is worth to mention that the writing methods of different electronic devices 101 are different, but the writing method of the same electronic device 101 is fixed. In this way, the electronic device 101 can determine the number and frequency of updates for the data stored in the cold data area created on the memory card, as well as the number and frequency of reads for the data stored in the cold data area according to the fixed writing methods. In addition, in the above-described initialization of the number of reads $C_R$, the number of reads $C_R$ may be to set to zero.

The memory card 102 includes a controller configured to process the stored data based on the start address and the end address.

In one implementation of the present application, the above-mentioned controller is specifically configured to:

convert the start address and the end address into a corresponding physical start address and a corresponding physical end address respectively by the controller based on a mapping relationship between a logical address and a physical address provided by a flash translation layer FTL; transfer the data corresponding to the physical start address and the physical end address into released block storage spaces according to a sequential order in which block storage spaces on the memory card is released, and update the mapping relationship according to the current physical start address and the physical end address of the transferred data.

In one implementation of the present application, the above-mentioned electronic device 101 is specifically configured to:

generate a cold data processing table containing the start address and the end address; transmit the cold data processing table to the controller of the memory card 102 through a private instruction in comply with the SD card protocol.

In one implementation of the present application, the cold data processing table can also include a header identifier and a trailer identifier;

in this case, the above controller is specifically configured to:

determine whether the cold data processing table is valid based on the header identifier and the trailer identifier; if the cold data processing table is valid, process the data correspond to the start address and the end address.

In one implementation of the present application, the cold data processing table may also include priorities corresponding to the cold data, wherein the priorities are determined based on the number $C_W$ of writes for the data in the target cold data area C.

In this case, the above controller is specifically configured to:

process the cold data corresponding to the start address and the end address according to the priorities.

Figure 2:
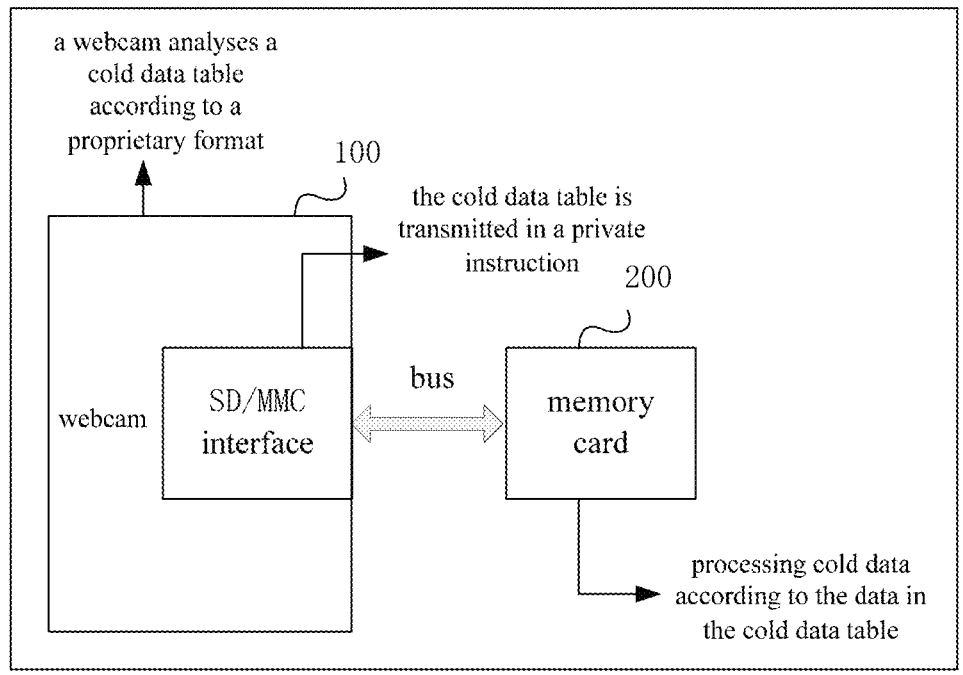
FIG. 2 is a block diagram of a system provided by an embodiment of the present application.

Taking a webcam as an example below, reference to FIG. 2, it is a block diagram of a system provided by an embodiment of the present application. As can be seen from FIG. 2, an SD/MMC (Secure Digital/Multimedia Card) interface is provided on the webcam 100, and the memory card 200 is connected to the SD/MMC interface of the webcam 100 via a bus, and then connected to the webcam 100.

The webcam 100 can format a memory card 200 in a proprietary manner before storing data on the memory card connected thereto so that a cold data area can be created on the memory card 200 in a fixed writing mode. At the same time, the webcam 100 can analyze the data stored on the memory card 200 through the formatting in a proprietary manner, obtain a cold data table, and then transmit a private instruction including the cold data table to the memory card 200 through the SD/MMC interface, and the memory card 200 processes the cold data according to the information in the cold data table.

By applying the embodiment shown in FIG. 1, the electronic device obtains the number $C_R$ of reads for data stored in a target cold data area C stored locally; in case that the number $C_R$ of reads reaches a preset threshold $T_{CR}$ for reading failure of cold data, the electronic device can determine that the stored data in the target cold data area C is the data to be processed, and then transmit a start address and a end address of the data stored in the target cold data area C to the controller of the memory card and initialize the number $C_R$ of reads; and the controller processes the stored data according to the start address and the end address. Here, the cold data scanning and determination are both completed by the electronic device, while the memory card only needs to process data, which reduces the calculation amount of the memory card, thereby improving the data reading and writing performance of the memory card.

Figure 3:
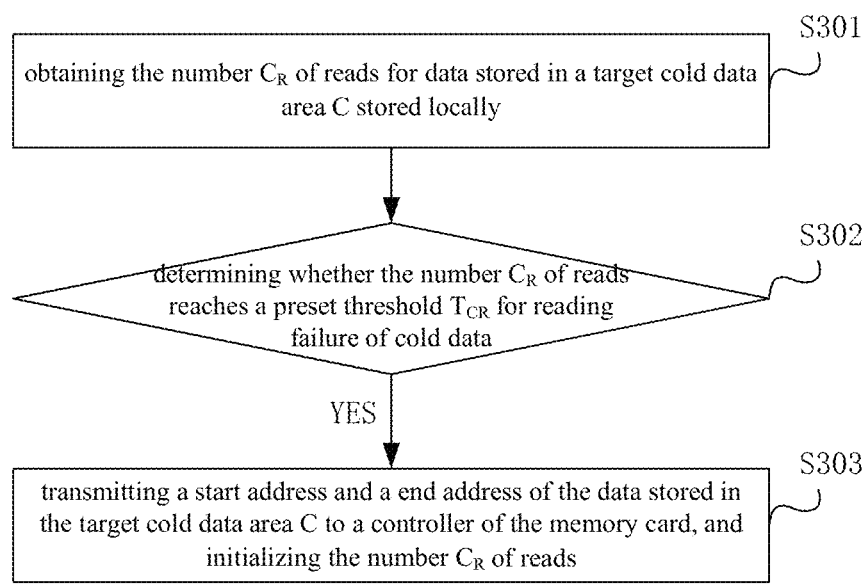
FIG. 3 is a schematic flowchart of a method for processing data provided by an embodiment of the present application.

Reference to FIG. 3, it is a schematic flowchart of a method for processing data provided by an embodiment of the present application. The method is applicable to an electronic device, wherein the electronic device is connected to a memory card that has been formatted in a proprietary manner in advance and the memory card includes at least one cold data area. Specifically, the method includes the following steps:

S301: obtaining the number $C_R$ of reads for data stored in a target cold data area C stored locally.

In one implementation of the present application, the number of reads for the stored data is incremented by 1 for each reading of the stored data in the cold data area.

S302: determining whether the number $C_R$ of reads reaches a preset threshold $T_{CR}$ for reading failure of cold data; if YES, executing S303.

In one implementation of the present application, a threshold $T_{CR}$ for reading failure of cold data is set in the electronic device in order to avoid the problem that data cannot be read due to excessive wear of the memory card when a certain data reading count reaches a certain extent. A certain piece of data is processed when the number $C_R$ of reads thereof reaches the preset threshold $T_{CR}$ for reading failure of cold data.

S303: transmitting a start address and a end address of the data stored in the target cold data area C to a controller of the memory card, and initializing the number $C_R$ of reads.

Here, the initializing can be understood as zeroing.

In this case, the controller of the memory card can process the stored data, to which the received start address and the received end address correspond, according to the start address and the end address. In addition, the electronic device sets the number $C_R$ of reads to zero so as to avoid that the number $C_R$ of reads for the stored data acquired next time is affected by the number $C_R$ of reads acquired this time, which results in accumulative statistics for the number $C_R$ of reads, rendering that the controller processes the same data while processing data (e.g. moving data) each time, thereby increasing the workload of the controller, while reducing the service life of the memory card.

In one implementation of the present application, the above step of transmitting the start address and the end address of the data stored in the target cold data area C to the controller of the memory card can include:

generating a cold data processing table containing the start address and the end address; and transmitting the cold data processing table to the controller.

Here, the cold data processing table should not be too large (e.g., the size of a cold data processing table is 512 bytes) so that the electronic device transmit the cold data processing table to the memory card quickly. In addition, in order to ensure the work efficiency of the memory card, the communication between the electronic device and the memory card may employ segmented communication, that is, increasing the transmission of the cold data processing table to the memory card when the performance of the electronic device is good so that the memory card can process more data, and reducing the transmission of the cold data processing table to the memory card when the performance of the electronic device is poor so that the memory card processes less data.

In one embodiment, the cold data processing table can further include a header identifier, a trailer identifier and priorities corresponding to the cold data. Here, the priorities are determined based on the number $C_W$ of writes for the data in the target cold data area C. It can be understood that, the smaller the number $C_W$ of writes is, the higher the priority of the cold data.

When the cold data processing table includes a header identifier and a trailer identifier, the controller of the memory card can firstly determine whether the cold data processing table is valid according to the header identifier and the trailer identifier before processing data, if valid, processing the data, to which the start address and the end address correspond. In one embodiment, there exists an inverse relationship between the header identifier and the trailer identifier in order to verify whether the cold data processing table is valid. For example, if a hexadecimal header identifier is 1, the trailer identifier should be E. Assuming that the header identifier Tabel_Head_Flag is 0x13245768ACBD09FE, if the trailer identifier Table_Tail_Flag is 0xECDBA8975342F601, there exists an inverse relationship between the header identifier and the trailer identifier, and it is then determined that the cold data processing table is valid and it is possible to process the data in the cold data processing table, to which the start address and the end address correspond; if the trailer identifier Table_Tail_Flag is not 0xECDBA8975342F601, there exists no inverse relationship between the header identifier and the trailer identifier, it can be determined that the cold data processing table is invalid and the cold data processing table should be discarded.

In addition, when the cold data processing table includes the priorities, to which the cold data corresponds, the controller of the memory card can process the data, to which the start address and the end address correspond, according to the priorities of each data. Assuming that the cold data processing table includes two cold data X and Y, the priority of X is 1, the priority of Y is 2, and priority 1 is greater than priority 2, so X is processed first and then Y follows. The writing count $C_W$ of data with high priority is smaller, processing the data with high priority first can better ensure the wear leveling of the memory card.

In the present application, the cold data table may further include other information, such as video data, picture data, index, log information, etc. Specifically, reference can be made to Table 1. The cold data table shown in Table 1 is composed of 512 bytes, including: a header identifier (8 bytes), 62 cold data stripes (each cold data stripe contains a start address (4 bytes), a end address (4 bytes), a priority (4 bytes), other information (video data, picture data, index, log information) (4 bytes)), and a trailer identifier (8 bytes).

TABLE 1

| start | 0x0 | 0x4 | 0x8 | 0xC |
|---|---|---|---|---|
| 0x0 | the start identifier: Tabel_Head_Flag | | the start address 1 | the end address 1 |
| 0x1 | the priority 1 | the other information 1 | the start address 2 | the end address 1 |
| 0x2 | the priority 2 | the other information 2 | | |
| ... | | | | |
| 0x1E | | | the start address 62 | the end address 62 |
| 0x1F | the priority 62 | the other information 62 | the trailor identifier: Table_Tail_Flag | |

In one implementation of the present application, a mapping relationship between a logical address and a physical address is stored in the FTL of the controller of the memory card. In this case, the process that the controller processes data can be as follows:

S1: converting the start address and the end address into a corresponding physical start address and a physical end address respectively, based on the mapping relationship between the logical address and the physical address provided by the flash translation layer FTL;

because that the start address and the end address transmitted by the electronic device to the controller of the memory card are logical addresses, in order to obtain data accurately, the memory card needs to convert the received logical address into a physical address and then obtain the corresponding data from the storage area, to which the physical address corresponds.

S2: transferring the data corresponding to the physical start address and the physical end address into released block storage spaces according to a sequential order in which block storage spaces on the memory card is released, and updating the mapping relationship according to the current physical start address and the physical end address of the transferred data.

The memory spaces on the memory card are stored in blocks, and the storage spaces are released by releasing one block storage space after another, rather than releasing all the block storage spaces at once. Assuming that on the current memory card exist block storage spaces A, B and C, the memory card releases A first, then C, and finally B, and then the data, to which the physical start address and the physical end address correspond, is transmitted to A first, then to C, and finally to B. In this case, the correspondence relationship between the logical address and the physical address changes, it is necessary to update the mapping relationship between the logical address and the physical address stored in the FTL so that it is possible accurately obtain the required data when processing it again. Here, a block storage space can be understood as a cold data area or a hot data area.

Figure 4:
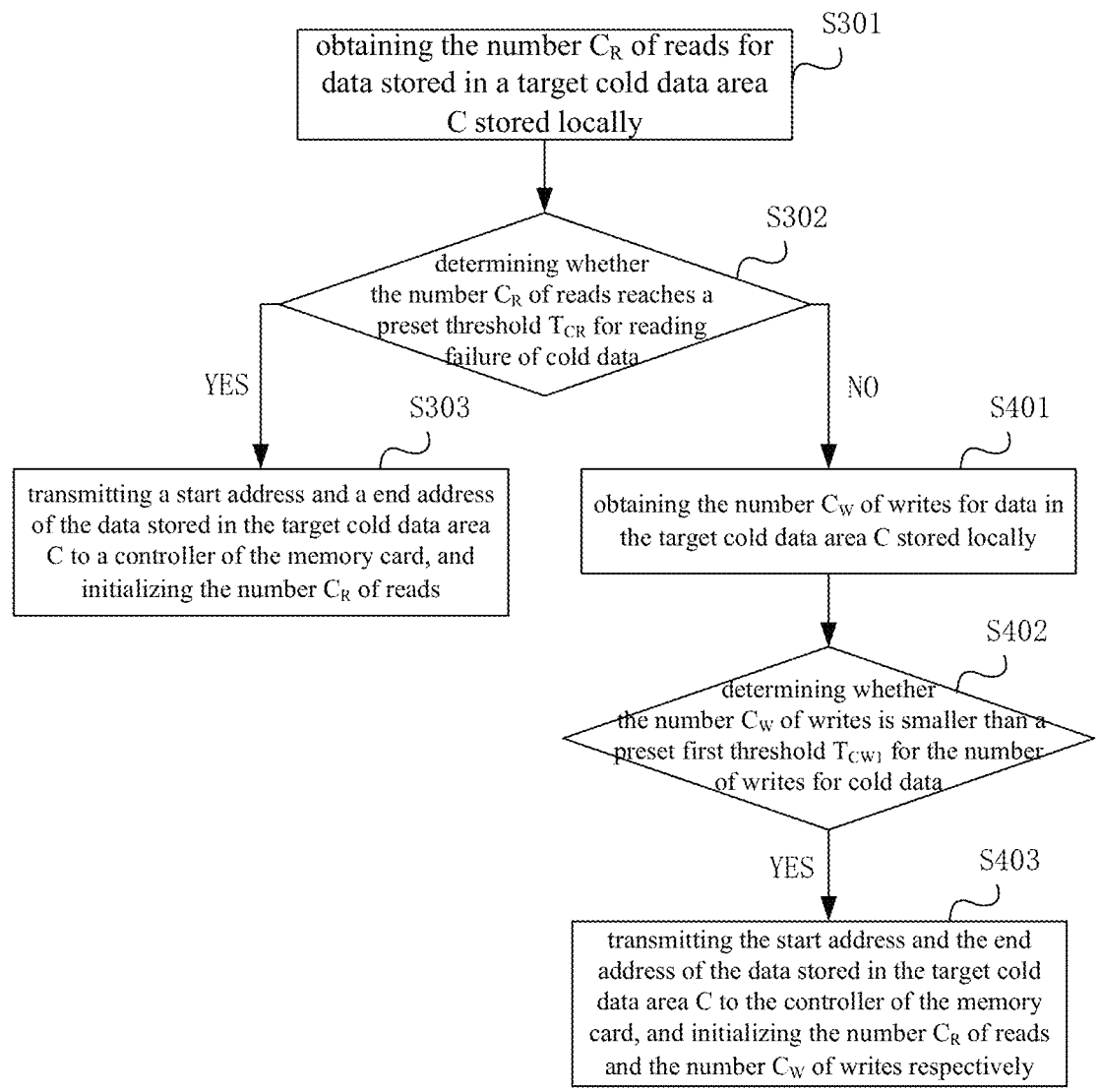
FIG. 4 is a schematic flowchart of another method for processing data provided by an embodiment of the present application.

In one implementation of the present application, the problem that the data can not be read is related not only to the reading count of the data, but also to the writing count thereof. At this point, the present application provides another method for processing data applicable to an electronic device, referring to FIG. 4. The method includes the following steps:

S401: obtaining the number $C_W$ of writes for data in the target cold data area C stored locally.

In one implementation of the present application, the number $C_W$ of writes for the data is incremented by 1 for each writing in the cold data area, which could also be understood as that the number $C_W$ of writes for the cold data area C is incremented by 1.

It is worth mentioning that S401 can be carried out before any of the steps S301 or S302, or can be carried out after any of the steps S301 or S302, and can also be carried out simultaneously with any of the steps S301 or S302, which is not limited by the present application. In addition, in case of determining that the number $C_R$ of reads does not reach the preset threshold $T_{CR}$ for reading failure of cold data, then executing the steps S401, S402 and S403 and determining whether the data is the data to be processed can effectively reduce the workload of the electronic device.

S402: determining whether the number $C_W$ of writes is smaller than a preset first threshold $T_{CW1}$ for the number of writes for cold data, if so, executing S403;

the data with a higher frequency of reads but a lower frequency of writes is called cold data, and therefore, when determining the cold data to be processed, the first threshold $T_{CW1}$ for the number of writes for cold data should not be too high, which can be taken in the range of [0, 5].

In one implementation of the present application, if it is determined that the number $C_W$ of writes is not smaller than the first threshold $T_{CW1}$ for the number of writes for cold data, it can be considered that the usage of each memory area of the current memory card is relatively balanced, and it is not necessary to process the data in the cold data area, the number $C_R$ of reads and the number $C_W$ of writes are respectively initialized to avoid that the number $C_R$ of reads for the stored data acquired next time is affected by the number $C_R$ of reads and the number $C_W$ of writes acquired this time, which results in accumulative statistics for the number $C_R$ of reads and the number $C_W$ of writes, rendering that the controller processes the same data while processing data each time, thereby increasing the workload of the controller, while also reducing the service life of the memory card because of excessive processing of data (e.g. moving data).

S403: transmitting the start address and the end address of the data stored in the target cold data area C to the controller of the memory card, and initializing the number $C_R$ of reads and the number $C_W$ of writes respectively.

In this case, the controller of the memory card can process the stored data, to which the start address and the end address correspond, according the received start address and the end address. In addition, the electronic device also needs to initialize both the number $C_R$ of reads and the number $C_W$ of writes.

Figure 5:
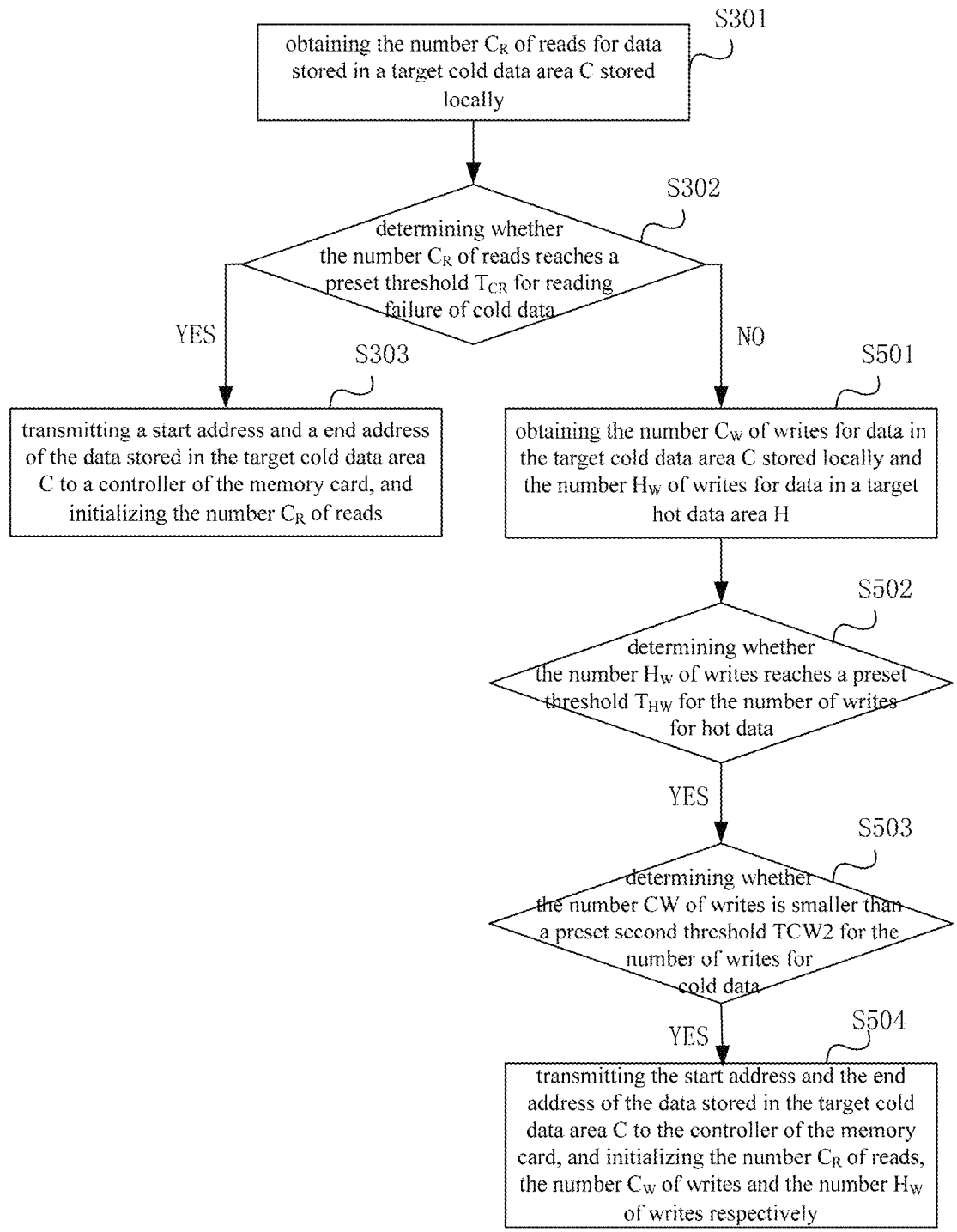
FIG. 5 is a schematic flowchart of another method for processing data provided by an embodiment of the present application.

In one implementation of the present application, the memory card can include at least one cold data area, and can also include at least one hot data area. In this case, in order to avoid the problem that the data cannot be read, a balanced consideration of the reading count of the stored data in both the hot data area and the cold data area is necessary. Specifically, FIG. 5 that is a schematic flowchart of another method for processing data provided by an embodiment of the present application can be referred to. The method includes the following steps:

S501: obtaining the number $C_W$ of writes for data in the target cold data area C stored locally and the number $H_W$ of writes for data in a target hot data area H.

In one implementation of the present application, the number $H_W$ of writes for data is incremented by 1 for each writing in the hot data area, which could also be understood as that the number $H_W$ of writes for hot data area H is incremented by 1.

It is worth mentioning that S501 can be carried out before any of the steps S301 or S302, or can be carried out after any of the steps S301 or S302, and can also be carried out simultaneously with any of the steps S301 or S302, which is not limited by the present application. In addition, in case of determining that the reading count $C_R$ does not reach the preset threshold of cold data reading failure count $T_{CR}$, then executing the steps S501, S502, S503 and S504 and determining whether the data is the data to be processed can effectively reduce the workload of the electronic device.

S502: determining whether the number $H_W$ of writes reaches a preset threshold $T_{HW}$ for the number of writes for hot data, if so, executing S503;

the data with a higher writing frequency is called hot data. If the writing count $H_W$ of the hot data stored in the hot data area is relatively small, it indicates that the update frequency of the hot data area is low, and with respect to the memory card, the wear conditions of the respective memory areas of the current memory card are relatively balanced. In regard to the memory card, the problem that data cannot be read in partial storage areas will not happen even if the cold data on the memory card is not processed. Therefore, the cold data cannot be processed, and thus the workload of the memory card is reduced.

It is worth mentioning that the threshold of hot data writing count $T_{CW}$ should not be too high in order to ensure that the wear conditions of the respective memory spaces of the memory card are balanced, which can be taken in the range of [6, 10].

In one implementation of the present application, if it is determined that the number $H_W$ of writes does not reach the preset threshold $T_{HW}$ for the number of writes for hot data, it can be considered that the usage of each memory area of the current memory card is relatively balanced, and it is not necessary to process the data in the cold data area, and the number $C_R$ of reads, the number $C_W$ of writes and the number $H_W$ of writes are respectively zeroed to avoid that the number $C_R$ of reads for the stored data acquired next time is affected by the number $C_R$ of reads, the number $C_W$ of writes and the number $H_W$ of writes acquired this time, which results in accumulative statistics for the number $C_R$ of reads, the number $C_W$ of writes and the number $H_W$ of writes, rendering that the controller processes the same data while processing data each time, thereby increasing the workload of the controller, while also reducing the service life of the memory card because of excessive processing of data (e.g. moving data).

S503: determining whether the number $C_W$ of writes is smaller than a preset second threshold $T_{CW2}$ for the number of writes for cold data; if so, executing S504;

Here, the second threshold $T_{CW2}$ for the number of writes for cold data and the first threshold $T_{CW1}$ for the number of writes for cold data can be same, or can be different, which is not limited by the present application.

In one implementation of the present application, if it is determined that the writing count $C_W$ is not smaller than the second threshold of cold data writing count $T_{CW2}$, it can be understood as that the wear conditions of respective memory areas of the current memory card are relatively balanced, and it is not necessary to process the data in the cold data area, and the number $C_R$ of reads, the number $C_W$ of writes and the number $H_W$ of writes are respectively initialized.

S504: transmitting the start address and the end address of the data stored in the target cold data area C to the controller of the memory card, and initializing the number $C_R$ of reads, the number $C_W$ of writes and the number $H_W$ of writes respectively.

In this case, the controller of the memory card can process the stored data, to which the start address and the end address correspond, based on the received start address and the end address. In addition, the electronic device also needs to initialize the number $C_R$ of reads, the number $C_W$ of writes and the number $H_W$ of writes.

By applying the above-described various embodiments, the electronic device obtains the number $C_R$ of reads for data stored in a target cold data area C stored locally; in case that the number $C_R$ of reads reaches a preset threshold $T_{CR}$ for reading failure of cold data, the electronic device can determine that the stored data in the target cold data area C is the data to be processed, and then transmit a start address and a end address of the data stored in the target cold data area C to the controller of the memory card and initialize the number $C_R$ of reads; and the controller processes the stored data according to the start address and the end address. Here, the cold data scanning and determination are both completed by the electronic device, while the memory card only needs to process data, which reduces the calculation amount of the memory card, thereby improving the data reading and writing performance of the memory card.

Figure 6:
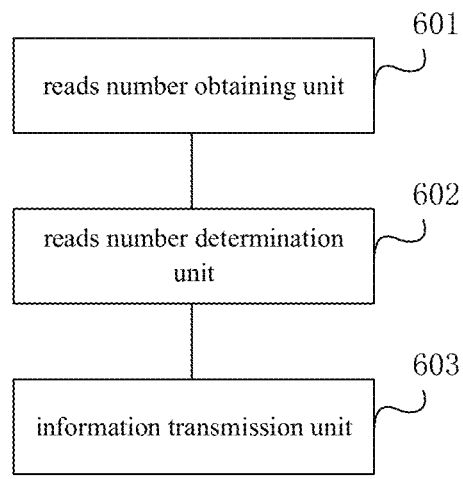
FIG. 6 is a schematic structural diagram of an apparatus for processing data provided by an embodiment of the present application.

Reference to FIG. 6, it is a schematic structural diagram of an apparatus for processing data provided by an embodiment of the present application. The apparatus is applicable to an electronic device, wherein the electronic device is connected to a memory card which has been formatted in a proprietary manner in advance and the memory card includes at least one cold data area. The apparatus includes:

a reads number obtaining unit 601, configured to obtain the number $C_R$ of reads for data stored in a target cold data area C stored locally;

a reads number determination unit 602, configured to determine whether the number $C_R$ of reads reaches a preset threshold $T_{CR}$ for reading failure of cold data;

an information transmission unit 603, configured to transmit, in case that the determination result of the reads number determination unit is YES, a start address and a end address of the data stored in the target cold data area C to a controller of the memory card, and initializing the number $C_R$ of reads for processing the stored data by the controller according to the start address and the end address.

Figure 7:
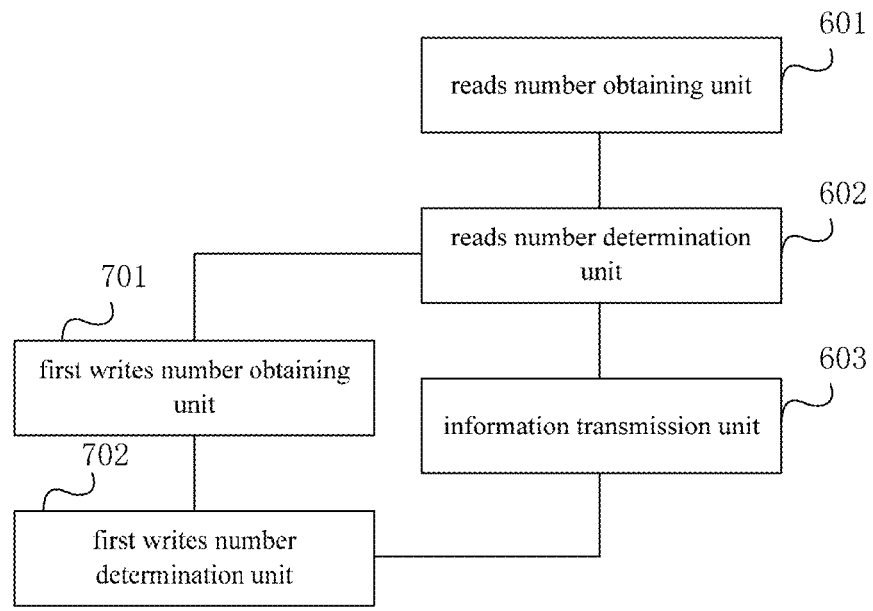
FIG. 7 is a schematic structural diagram of another apparatus for processing data provided by an embodiment of the present application.

In one implementation of the present application, the problem that the data can not be read is related not only to the reading count of the data, but also to the writing count thereof. At this point, the present application provides another method for processing data applicable to an electronic device, referring to FIG. 7. The apparatus can further include:

a first writes number obtaining unit 701, configured to obtain the number $C_W$ of writes for data in the target cold data area C stored locally in case that the determination result of the reads number determination unit is NO;

a first writes number determination unit 702, configured to determine whether the number $C_W$ of writes is smaller than a preset first threshold $T_{CW1}$ for the number of writes for cold data, if the number $C_W$ of writes is smaller than a preset first threshold $T_{CW1}$ for the number of writes for cold data, trigger the information transmission unit 603.

In this case, the information transmission unit 603 is specifically configured to:

transmit the start address and the end address of the data stored in the target cold data area C to the controller of the memory card, and initialize the number $C_R$ of reads and the number $C_W$ of writes respectively for processing the stored data by the controller according to the start address and the end address.

Figure 8:
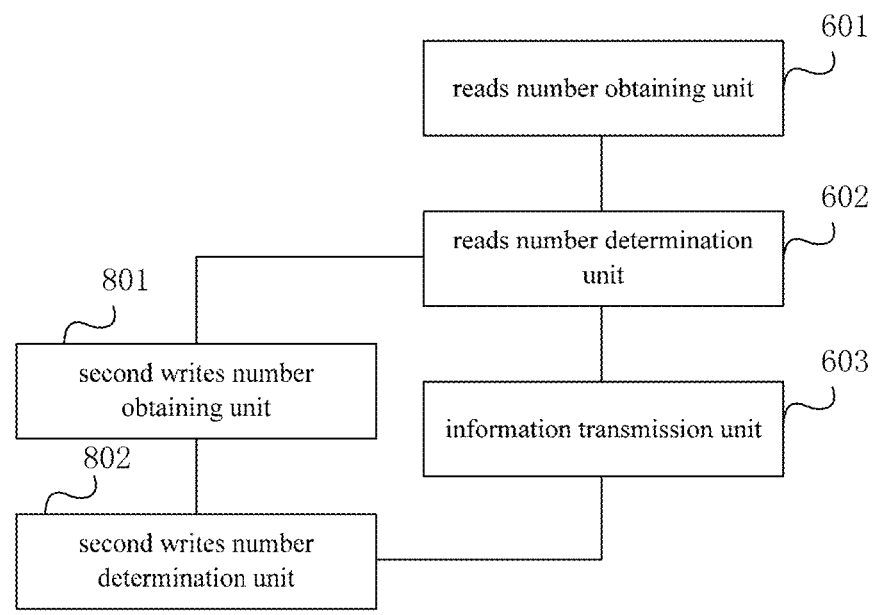
FIG. 8 is a schematic structural diagram of another apparatus for processing data provided by an embodiment of the present application.
Figure 9:
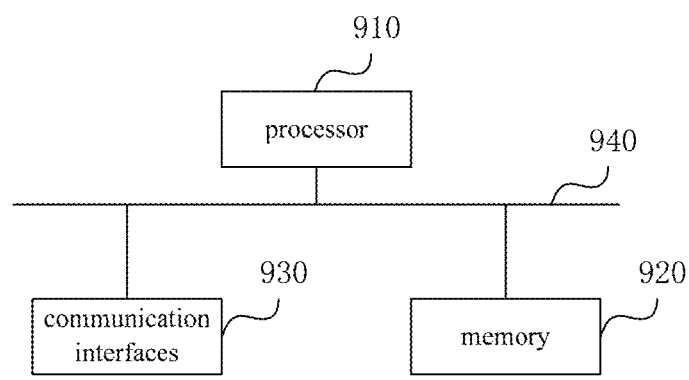
FIG. 9 is a schematic structural diagram of an electronic device provided by an embodiment of the present application.

In one implementation of the present application, the memory card can include at least one cold data area, and further include at least one hot data area. In this case, in order to avoid the problem that the data cannot be read, a balanced consideration of the reading count of the stored data in both the hot data area and the cold data area is necessary. Specifically, FIG. 8 that is a schematic structural diagram of another apparatus for processing data applicable to an electronic device provided by an embodiment of the present application can be referred to. The apparatus can further include:

a second writes number obtaining unit 801, configured to obtain the number $C_W$ of writes for data in the target cold data area C stored locally and the number $H_W$ of writes for data in a target hot data area H in case that the determination result of the reads number determination unit is NO;

a second writes number determination unit 802, configured to determine whether the number $H_W$ of writes reaches a preset threshold $T_{HW}$ for the number of writes for hot data, if the threshold $T_{HW}$ for the number of writes is reached, determine whether the number $C_W$ of writes is smaller than a preset second threshold $T_{CW2}$ for the number of writes for cold data, if the number $C_W$ of writes is smaller than a preset second threshold $T_{CW2}$ for the number of writes for cold data, trigger the information transmission unit 603.

In this case, the information transmission unit 603 is specifically configured to:

transmit the start address and the end address of the data stored in the target cold data area C to the controller of the memory card, and initialize the number $C_R$ of reads, the number $C_W$ of writes and the number $H_W$ of writes respectively for processing the stored data by the controller according to the start address and the end address.

By applying the above-described various embodiments, the electronic device obtains the number $C_R$ of reads for data stored in a target cold data area C stored locally; in case that the number $C_R$ of reads reaches a preset threshold $T_{CR}$ for reading failure of cold data, the electronic device can determine that the stored data in the target cold data area C is the data to be processed, and then transmit a start address and a end address of the data stored in the target cold data area C to the controller of the memory card and initialize the number $C_R$ of reads; and the controller processes the stored data according to the start address and the end address. Here, the cold data scanning and determination are both completed by the electronic device, while the memory card only needs to process data, which reduces the calculation amount of the memory card, thereby improving the data reading and writing performance of the memory card.

In addition, an embodiment of the present application also provides an electronic device, which is connected to the memory card, and the memory card has been formatted in a proprietary manner in advance and includes at least one cold data area. The electronic device includes:

a processor 910, a memory 920, communication interfaces 930 and a bus 940;

the processor 910, the memory 920 and the communication interfaces 930 are connected and communicate with each other via the bus 940;

the memory 920 is configured to store executable program codes;

the processor 910 is configured to execute programs corresponding to the executable program codes by reading the executable program codes stored in the memory 920 so as to perform the following steps:

obtaining the number $C_R$ of reads for data stored in a target cold data area C stored locally;

determining whether the number $C_R$ of reads reaches a preset threshold $T_{CR}$ for reading failure of cold data;

if the number $C_R$ of reads reaches a preset threshold $T_{CR}$ for reading failure of cold data, transmitting a start address and a end address of the data stored in the target cold data area C to a controller of the memory card, and initializing the number $C_R$ of reads for processing the stored data by the controller according to the start address and the end address.

There exists a variety of forms for the electronic device, which include but do not be limited to:

(1) mobile communication equipment: This kind of equipment is characterized by mobile communication capabilities, and aims to provide voice, data communications as the main goal. Such terminals include: smart phones (such as IPHONE), multimedia phones, functional phones, and low-end mobile phones.

(2) ultra-mobile personal computer equipment: this kind of equipment belongs to the category of personal computer, which has the function of computing and possessing and generally possesses mobile networking property. This kind of terminal includes PDA, MID and UMPC equipment and the like, for example IPAD.

(3) portable entertainment equipment: this kind of equipment can display and play multimedia content. This kind of equipment includes audio and video players (for example, iPod), handheld game consoles, e-books readers, as well as intelligent toys and portable vehicle navigation equipment.

(4) server: an equipment providing computing services, the composition of the server includes a processor, a hard disk, a memory, a system bus and the like. The server architecture is similar to the generic computer architecture, however, due to the need to provide highly reliable services, therefore the requirement in the aspects of the processing capacity, the stability, the reliability, the security, the scalability, the manageability and the other aspects are relatively high.

(5) other electronic devices with data exchange function.

As can be seen from the above, in the embodiments of the present application, the electronic device obtains the number $C_R$ of reads for data stored in a target cold data area C stored locally; in case that the number $C_R$ of reads reaches a preset threshold $T_{CR}$ for reading failure of cold data, the electronic device can determine that the stored data in the target cold data area C is the data to be processed, and then transmit a start address and a end address of the data stored in the target cold data area C to the controller of the memory card and initialize the number $C_R$ of reads; and the controller processes the stored data according to the start address and the end address. Here, the cold data scanning and determination are both completed by the electronic device, while the memory card only needs to process data, which reduces the calculation amount of the memory card, thereby improving the data reading and writing performance of the memory card.

In addition, an embodiment of the present application further provides an application program applicable to perform the method for processing data described by the embodiments of the present application when being executed;

the method for processing data is applicable to an electronic device, wherein the electronic device is connected to a memory card that has been formatted in a proprietary manner in advance and the memory card includes at least one cold data area, characterized in that the method includes:

obtaining the number $C_R$ of reads for data stored in a target cold data area C stored locally;

determining whether the number $C_R$ of reads reaches a preset threshold $T_{CR}$ for reading failure of cold data;

if the number $C_R$ of reads reaches a preset threshold $T_{CR}$ for reading failure of cold data, transmitting a start address and a end address of the data stored in the target cold data area C to a controller of the memory card, and initializing the number $C_R$ of reads for processing the stored data by the controller according to the start address and the end address.

As can be seen from the above, in the embodiments of the present application, by executing the above application, the electronic device obtains the number $C_R$ of reads for data stored in a target cold data area C stored locally; in case that the number $C_R$ of reads reaches a preset threshold $T_{CR}$ for reading failure of cold data, the electronic device can determine that the stored data in the target cold data area C is the data to be processed, and then transmit a start address and a end address of the data stored in the target cold data area C to the controller of the memory card and initialize the number $C_R$ of reads; and the controller processes the stored data according to the start address and the end address. Here, the cold data scanning and determination are both completed by the electronic device, while the memory card only needs to process data, which reduces the calculation amount of the memory card, thereby improving the data reading and writing performance of the memory card.

In addition, an embodiment of the present application further provides a storage medium configured to store an application, which is used for performing the method for processing data described by the embodiments of the present application;

the method for processing data is applicable to an electronic device, wherein the electronic device is connected to a memory card that has been formatted in a proprietary manner in advance and the memory card includes at least one cold data area, characterized in that the method includes:

obtaining the number $C_R$ of reads for data stored in a target cold data area C stored locally;

determining whether the number $C_R$ of reads reaches a preset threshold $T_{CR}$ for reading failure of cold data;

if the number $C_R$ of reads reaches a preset threshold $T_{CR}$ for reading failure of cold data, transmitting a start address and a end address of the data stored in the target cold data area C to a controller of the memory card, and initializing the number $C_R$ of reads for processing the stored data by the controller according to the start address and the end address.

As can be seen from the above, in the embodiments of the present application, by executing the above application stored in the above storage medium, the electronic device obtains the number $C_R$ of reads for data stored in a target cold data area C stored locally; in case that the number $C_R$ of reads reaches a preset threshold $T_{CR}$ for reading failure of cold data, the electronic device can determine that the stored data in the target cold data area C is the data to be processed, and then transmit a start address and a end address of the data stored in the target cold data area C to the controller of the memory card and initialize the number $C_R$ of reads; and the controller processes the stored data according to the start address and the end address. Here, the cold data scanning and determination are both completed by the electronic device, while the memory card only needs to process data, which reduces the calculation amount of the memory card, thereby improving the data reading and writing performance of the memory card.

The embodiments of the apparatus, the electronic device, the application program and the storage medium are briefly described and reference can be made to the description of the embodiments of the method for its related contents since the embodiments of the device are substantially similar to those of the method.

It should be noted that the relationship terms herein such as "first", "second" and the like are only used to distinguish one entity or operation from another entity or operation, but do not necessarily require or imply that there is actual relationship or sequence between these entities or operations. Moreover, the terms "include", "comprise" or any variants thereof are intended to cover a non-exclusive inclusion, such that processes, methods, articles or devices comprising a series of elements include not only those elements listed, but also other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices which include the listed elements.

It can be understood by a person skilled in the art that all or a part of steps in the implementation of the above method can be carried out by related hardware being instructed by programs, which can be stored in computer readable storage medium, such as ROM/RAM, disk and optical disk etc.

The embodiments described above are just preferable embodiments of the present invention, and not indented to limit the protection scope of the present invention. Any modifications, alternatives, improvements or the like within the spirit and principle of the present invention are included in the protection scope of the present invention.

What is claimed is:

1. A method for processing data, which is applicable to an electronic device being connected to a memory card that has been formatted in a proprietary manner in advance and comprises at least one cold data area, wherein the method comprises:

obtaining the number $C_R$ of reads for data stored in a target cold data area C stored locally;

determining whether the number $C_R$ of reads reaches a preset threshold $T_{CR}$ m for reading failure of cold data;

if the number $C_R$ of reads reaches a preset threshold $T_{CR}$ m for reading failure of cold data, transmitting a start address and a end address of the data stored in the target cold data area C to a controller of the memory card, and initializing the number $C_R$ of reads for processing the stored data by the controller according to the start address and the end address, wherein the step of processing the stored data by the controller according to the start address and the end address comprises:

converting the start address and the end address into a corresponding physical start address and a corresponding physical end address respectively by the controller based on a mapping relationship between a logical address and a physical address provided by a flash translation layer FTL; transferring the data corresponding to the physical start address and the physical end address into block storage spaces that are arranged in a sequential order in which the block storage spaces on the memory card are released, and updating the mapping relationship previously stored in the memory card according to the current physical start address and the physical end address of the transferred data.

2. The method according to claim 1, wherein in case of determining that the number $C_R$ of reads does not reach the preset threshold $T_{CR}$ m for reading failure of cold data, the method further comprises:

obtaining the number $C_W$ of writes for data in the target cold data area C stored locally;

determining whether the number $C_W$ of writes is smaller than a preset first threshold $T_{CW1}$ for the number of writes for cold data;

if the number $C_W$ of writes is smaller than a preset first threshold $T_{CW1}$ for the number of writes for cold data, transmitting the start address and the end address of the data stored in the target cold data area C to the controller of the memory card, and initializing the number $C_R$ of reads and the number $C_W$ of writes respectively for processing the stored data by the controller according to the start address and the end address.

3. The method according to claim 1, wherein the memory card further comprises at least one hot data area, in case of determining that the number $C_R$ of reads does not reach the preset threshold $T_{CR}$ for reading failure of cold data, the method further comprises:

obtaining the number $C_W$ of writes for data in the target cold data area C stored locally and the number $H_W$ of writes for data in a target hot data area H;

determining whether the number $H_W$ of writes reaches a preset threshold $T_{HW}$ for the number of writes for hot data;

if the number $H_W$ of writes reaches a preset threshold $T_{HW}$ for the number of writes for hot data, determining whether the number $C_W$ of writes is smaller than a preset second threshold $T_{CW2}$ for the number of writes for cold data;

if the number $C_W$ of writes is smaller than the second threshold $T_{CW2}$ for the number of writes for cold data, transmitting the start address and the end address of the data stored in the target cold data area C to the controller of the memory card, and initializing the number $C_R$ of reads, the number $C_W$ of writes and the number $H_W$ of writes respectively for processing the stored data by the controller according to the start address and the end address.

4. The method according claim 1, wherein the step of transmitting the start address and the end address of the data stored in the target cold data area C to the controller of the memory card comprises:

generating a cold data processing table containing the start address and the end address; and transmitting the cold data processing table to the controller.

5. The method according to claim 4, wherein the cold data processing table comprises a header identifier and a trailer identifier;
the step of processing the stored data by the controller according to the start address and the end address comprises:
determining whether the cold data processing table is valid by the controller based on the header identifier and the trailer identifier; if the cold data processing table is valid, processing the stored data corresponding to the start address and the end address.

6. The method according to claim 4, wherein the cold data processing table comprises priorities corresponding to the cold data, wherein the priorities are determined based on the number $C_W$ of writes;
the step of processing the stored data by the controller according to the start address and the end address comprises:
processing the stored data corresponding to the start address and the end address correspond by the controller according to the priorities.

7. A data processing system, comprising: an electronic device and a memory card, wherein the electronic device is connected to the memory card, the memory card has been formatted in a proprietary manner in advance and comprises at least one cold data area, and wherein:
the electronic device is configured to obtain the number $C_R$ of reads for data stored in a target cold data area C stored locally, determine whether the number $C_R$ of reads reaches a preset threshold $T_{CR}$ m for reading failure of cold data, and if the number $C_R$ of reads reaches a preset threshold $T_{CR}$ m for reading failure of cold data, transmit a start address and a end address of the data stored in the target cold data area C to a controller of the memory card, and initialize the number $C_R$ of reads; and
the memory card comprises a controller configured to process the stored data according to the start address and the end address,
wherein the controller is specifically configured to:
convert the start address and the end address into a corresponding physical start address and a corresponding physical end address respectively by the controller based on a mapping relationship between a logical address and a physical address provided by a flash translation layer FTL; transfer the data corresponding to the physical start address and the physical end address into block storage spaces that are arranged in a sequential order in which the block storage spaces on the memory card are released, and update the mapping relationship previously stored in the memory card according to the current physical start address and the physical end address of the transferred data.

8. The system according to claim 7, wherein,
the electronic device is specifically configured to generate a cold data processing table containing the start address and the end address, and transmit the cold data processing table to the controller.

9. The system according to claim 8, wherein the cold data processing table further comprises a header identifier and a trailer identifier;
the controller is specifically configured to:
determine whether the cold data processing table is valid by the controller based on the header identifier and the trailer identifier; if the cold data processing table is valid, process the stored data corresponding to the start address and the end address.

10. The system according to claim 8, wherein the cold data processing table further comprises priorities corresponding to the cold data, wherein the priorities are determined based on the number $C_W$ of writes;
the controller is specifically configured to:
process the data corresponding to the start address and the end address correspond according to the priorities.

11. An electronic device, wherein the electronic device comprises:
a processor, a memory, communication interfaces and a bus;
the processor, the memory and the communication interfaces are connected and communicate with each other via the bus;
the memory is configured to store executable program codes;
the processor is configured to execute programs corresponding to the executable program codes by reading the executable program codes stored in the memory so as to perform the following steps:
obtaining the number $C_R$ of reads for data stored in a target cold data area C stored locally;
determining whether the number $C_R$ of reads reaches a preset threshold $T_{CR}$ m for reading failure of cold data;
if the number $C_R$ of reads reaches a preset threshold $T_{CR}$ m for reading failure of cold data, transmitting a start address and a end address of the data stored in the target cold data area C to a controller of the memory card, and initializing the number $C_R$ of reads for processing the stored data by the controller according to the start address and the end address,
wherein the step of processing the stored data by the controller according to the start address and the end address comprises:
converting the start address and the end address into a corresponding physical start address and a corresponding physical end address respectively by the controller based on a mapping relationship between a logical address and a physical address provided by a flash translation layer FTL; transferring the data corresponding to the physical start address and the physical end address into block storage spaces that are arranged in a sequential order in which the block storage spaces on the memory card are released, and updating the mapping relationship previously stored in the memory card according to the current physical start address and the physical end address of the transferred data.

12. A storage medium, wherein the storage medium is configured to store an application program for carrying out the method for processing data according to claim 1.

13. The electronic device according to claim 11, wherein in case of determining that the number CR of reads does not reach the preset threshold TCR for reading failure of cold data, the method further comprises:
obtaining the number CW of writes for data in the target cold data area C stored locally;
determining whether the number CW of writes is smaller than a preset first threshold TCW1 for the number of writes for cold data;
if the number CW of writes is smaller than a preset first threshold TCW1 for the number of writes for cold data, transmitting the start address and the end address of the data stored in the target cold data area C to the controller of the memory card, and initializing the number CR of reads and the number CW of writes respectively for processing the stored data by the controller according to the start address and the end address.

14. The electronic device according to claim 11, wherein the memory card further comprises at least one hot data area, in case of determining that the number $C_R$ of reads does not reach the preset threshold $T_{CR}$ m for reading failure of cold data, the method further comprises:

obtaining the number $C_W$ of writes for data in the target cold data area C stored locally and the number $H_W$ of writes for data in a target hot data area H;

determining whether the number $H_W$ of writes reaches a preset threshold $T_{HW}$ for the number of writes for hot data;

if the number $H_W$ of writes reaches a preset threshold $T_{HW}$ for the number of writes for hot data, determining whether the number $C_W$ of writes is smaller than a preset second threshold $T_{cw2}$ for the number of writes for cold data;

if the number $C_W$ of writes is smaller than the second threshold $T_{CW2}$ for the number of writes for cold data, transmitting the start address and the end address of the data stored in the target cold data area C to the controller of the memory card, and initializing the number $C_R$ of reads, the number $C_W$ of writes and the number $H_W$ of writes respectively for processing the stored data by the controller according to the start address and the end address.

* * * * *